Jan. 14, 1958 H. P. LEWIS ET AL 2,820,113

ELECTRICAL SWITCHING DEVICE

Filed March 8, 1956 6 Sheets-Sheet 1

INVENTORS
HAROLD P. LEWIS
JACOB SCHMIER
BY Harry Langsam
ATTORNEY

ELECTRICAL SWITCHING DEVICE

Filed March 8, 1956 6 Sheets-Sheet 2

INVENTORS
HAROLD P. LEWIS
JACOB SCHMIER
BY Harry Langsam
ATTORNEY

Jan. 14, 1958 H. P. LEWIS ET AL 2,820,113

ELECTRICAL SWITCHING DEVICE

Filed March 8, 1956 6 Sheets-Sheet 3

INVENTORS
HAROLD P. LEWIS
JACOB SCHMIER
BY Harry Langsam
ATTORNEY

ELECTRICAL SWITCHING DEVICE

INVENTORS
HAROLD P. LEWIS
JACOB SCHMIER
BY Harry Langsam
ATTORNEY

ELECTRICAL SWITCHING DEVICE

Filed March 8, 1956 6 Sheets-Sheet 5

INVENTORS
HAROLD P. LEWIS
JACOB SCHMIER
BY Harry Langsam
ATTORNEY

INVENTORS
HAROLD P. LEWIS
JACOB SCHMIER
BY
Harry Langsam
ATTORNEY

United States Patent Office 2,820,113

Patented Jan. 14, 1958

2,820,113

ELECTRICAL SWITCHING DEVICE

Harold P. Lewis, Newtown, and Jacob Schmier, Allentown, Pa., assignors to Rodale Manufacturing Company, Inc., Lehigh County, Pa.

Application March 8, 1956, Serial No. 570,302

6 Claims. (Cl. 200—6)

Our invention relates to an electrical switch wherein the circuit is made or broken by applying a direct linear pressure to the control button.

Our invention is applicable to a single circuit as well as a double circuit switch, a three-way circuit switch, or a four-way switch.

It is an object of our invention to provide a switch to control the energizing or de-energizing of an electrical circuit by applying a direct pressure to the control button instead of turning, twisting or flipping a control knob or lever.

Another object of our invention is to provide an electrical switch wherein the contacts will assume a fully "on" position or a fully "off" position.

Another object of our invention is to provide an electrical switching device with a single push putton which is adaptable either to manual operation, such as electric light circuits and home appliances, or to mechanical operation, such as in the control of circuits in automatic machinery.

Another object of our invention is to provide an electrical push button switching device which is relatively quiet in operation compared with existing equipment of similar type.

Another object of our invention is to provide an electrical switching device of the push button type so that the operating cams thereof can be easily re-positioned on the cam shaft in order to adapt the switch for use as a single switch, a three-way switch, a four-way switch, or a double pole switch.

Another object of our invention is to provide an electrical switching device of the push button type which has a visual indicating means to show whether said switching device is in the "on" or in the "off" position, such visual indicator being very desirable when an electrical switch is remote from the electrical device which it controls.

A further object of our invention is to provide an electrical switching device of the push button type which, because of its size, and particularly because of the shape of the operating button thereof, will fit all installations where standard type toggle switches are now used, making it unnecessary to replace wall boxes and switch plates when the switching device revealed herein is used as a replacement for toggle type switches.

Another object of our invention is to provide an improved electrical switch which controls the circuit in "on" position by direct pressure upon the control button and wherein the same control button is pressed to de-energize the circuit to "off" position. In other words, the circuit is alternately changed even though the identical linear pressure is applied alternately.

In certain motor loads, it is customary, and even required by the underwriters, to break the circuit on both sides, otherwise the live line may not be broken, only the ground line being broken, and the motor will continue to operate. Where 220 v. circuit is used, if the motor is grounded then one side will be opened and one side will continue to have 110 v. directly grounded through the motor.

Another object of our invention is to provide an electrical switch applicable to controlling household electrical circuits wherein the terminals readily slide into position in a complementary casing.

It is another object of our invention to provide an electrical switch which may be rapidly and accurately assembled, and wherein it will have a long and useful life.

Another object of our invention is to provide an electrical switch wherein the circuit is controlled by a cam which is actuated by a ratchet wheel mounted upon the same shaft, and wherein the shaft is spring pressed upon its bearings.

Another object of our invention is to provide a cam for actuating the make-and-break contacts of an electrical switch whereby the cam allows only the extreme fully "off" or fully "on" position.

It is of interest here to note that in electrical switches, when the contacts of opposite polarity are brought into close proximity with each other, but not quite touching, an electrical arc is likely to jump across the gap between the contacts. This arc will continue to burn until the contact points have been consumed. Conversely, when electrical contacts which have been closed, forming an electrical circuit, are opened slightly, an arc will burn between them until the contacts have been completely burned away. The failure of switches under such circumstances constitutes a serious fire hazard.

Other objects of our invention are to provide an improved device of the character described, that is easily and economically produced, which is sturdy in construction, and which is highly efficient in operation.

With the above and related objects in view, our invention consists in the details of construction and combination of parts, as will be more fully understood from the following description, when read in conjunction with the accompanying drawings, in which.

Figure 1:
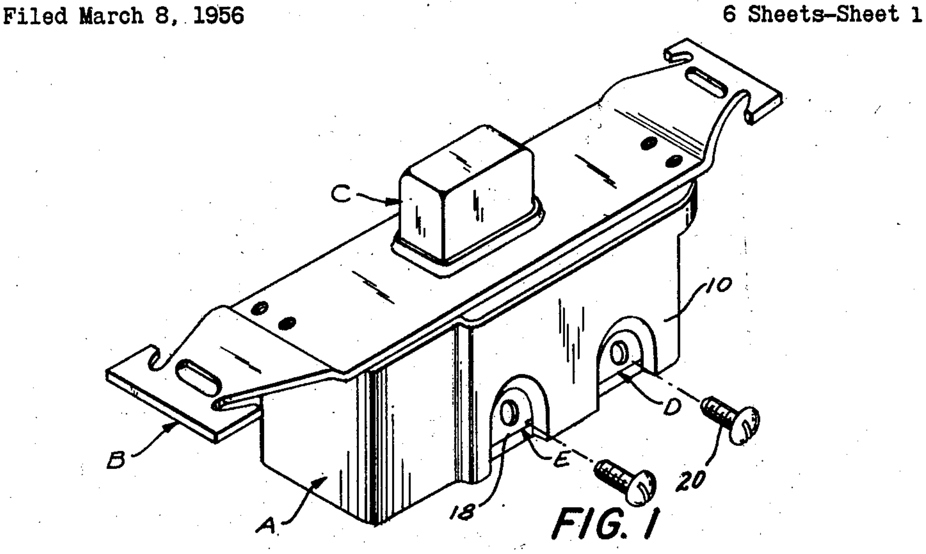
Fig. 1 is a perspective view of an electrical switch embodying our invention.

Referring now in greater detail to the drawings, wherein similar reference characters refer to similar parts, we show a push button switch wherein it comprises a housing, generally designated as A, a mounting or cover plate, generally designated as B, and a button, generally designated as C, which projects through the plate B. Within the housing there are two electrical contacts, one of which is stationary, generally designated as D, and the other contact is movable, and generally designated as E. The movement of the button C in a rectilinear direction presses upon a pivotally mounted pawl lever or pawl actuator, generally designated as F, and a pawl 62 mounted thereon which actuates a ratchet wheel, generally designated as G. The ratchet wheel G is mounted upon a shaft, generally designated as H, which carries a cam, generally designated as J, which engages and moves the movable contact E.

The casing A is of parallelpiped configuration with an open top, and on one side wall 10 are a pair of T-shaped slots 12, 14 which open to the interior chamber 16 of the casing, and at the bottom of the slot 12 is a through opening 18 in the wall 10 for a conductor holding screw 20. The opening 18 is located adjacent the casing bottom 22 so that an electrical conductor may be attached to the stationary contact D.

Figure 12:
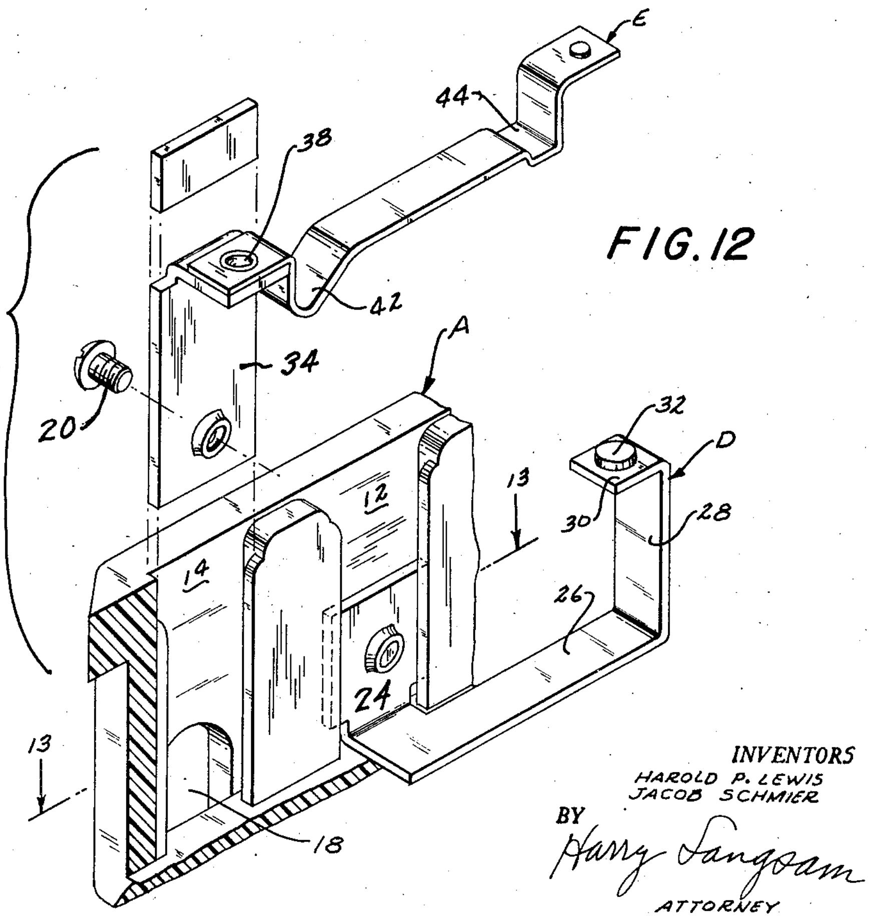
Fig. 12 is a perspective view of a portion of the casing and two of the terminals.

The stationary contact D (Fig. 12 )is comprised of an electrical conducting strip having an elongated end 24 which slides into the T-shaped slot 12. From the lowermost end (Fig. 6) of the end 24 is a right angle extension 26 which runs along the bottom of the casing to join a vertical extension 28 that runs against a casing wall 10A. The uppermost end of the vertical extension terminates in a horizontally extending strip with its free end 30 bent to be parallel to and spaced from the horizontally extending portion 26. A make-and-break metal contact 32, which will not easily pit or melt when an arc is formed, is fastened to the free end 30 of the stationary contact D.

Figure 2:
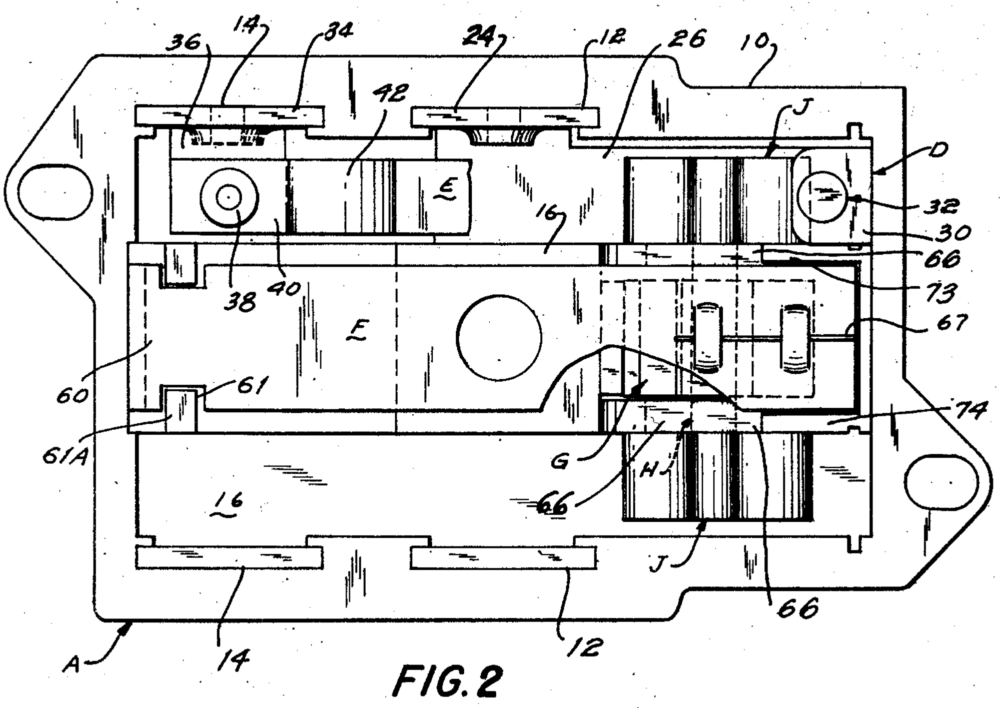
Fig. 2 is a sectional view taken along the line 2—2 of Fig. 3.

The movable strip contact E (Figs. 2 and 4) has one end 34 which slides into the T-shaped slot 14, and at its upper end is a bend or flange 36 with an opening therein for receiving a holding rivet 38. A second strip 40 of the movable contact E has a U-shaped bend 42 near the rivet fastening opening and a second U-shaped bend 44 adjacent the cam J. The second strip 40 is resiliently mounted and is moved or actuated by engagement with one of the cam lobes 48 on the cam J that is rigidly mounted upon a square portion 50 of the shaft H. Each of the lobes 48 (four being used and they are spaced 90° apart) on the cam J have a space 52 therebetween whereby the contacts 32, 46 may be brought together as shall be hereinafter described.

Figure 3:
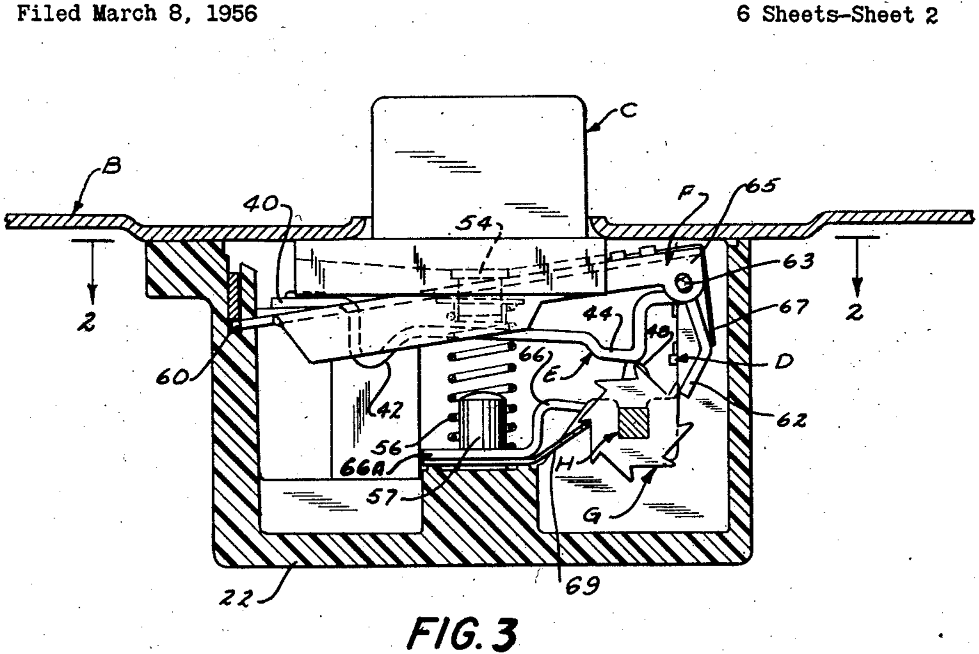
Fig. 3 is a fragmentary sectional side view showing the ratchet within its housing or casing.

The button C has an internal projection 54 on which is mounted a helical compression spring 56 to keep the button pressed outwardly in its normal position. A molded cylindrical projection 57 on the casing serves to guide and to retain the other end of the helical spring in position. The surface 58 of the button C engages the body of the pawl lever F that is pivotally mounted at the end 60 (Fig. 2), and the pawl lever has a pivotally connected pawl 62 (Fig. 3) which engages the ratchet teeth of the ratchet wheel G that is mounted upon the same shaft H as the cam J. A slot 61 in each side of the pawl lever received a projection 61A which is integrally formed with the casing A to provide the pivotal connection at the end 60 of the pawl lever F. The pawl 62 is pivotally connected at 63 to each side 65 of the pawl lever F.

Figure 14:
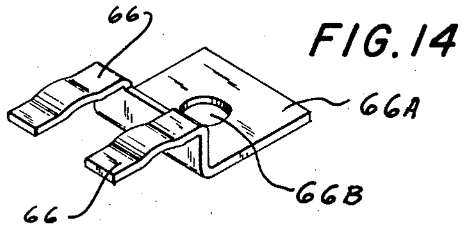
Fig. 14 is a perspective view of the cam and ratchet wheel shaft holding spring.
Figure 13:
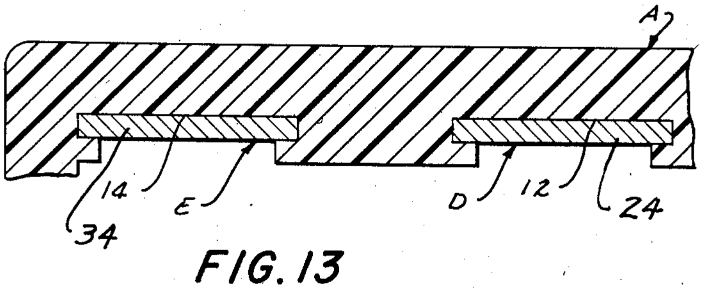
Fig. 13 is a sectional view taken along the line 13—13 of Fig. 12.

In Fig. 14 is disclosed a combined cam and ratchet wheel shaft holding spring on the casing bearing which has a body portion 66A with an opening 66B therein to interfit with casing projection 57 and it is held in place by the helical spring 56. The holding spring has two spring arms 66, 66 which engage the shaft H over the bearings 76, 78 in the casing, see Figs. 9 and 14. This spring clamps the shaft in its proper position without any other fastening device and the arms or fingers 66 provide constant tension to hold the shaft 7 in the bearing groove.

A small spring 67 (Fig. 3) presses the pawl 62 against one ratchet tooth on the ratchet wheel G. A locking pawl or detent 69 prevents the ratchet wheel from rotating in a reverse direction. The locking pawl 69 has a central opening adjacent one end 70 which opening fits over the projection 57.

Figure 4:
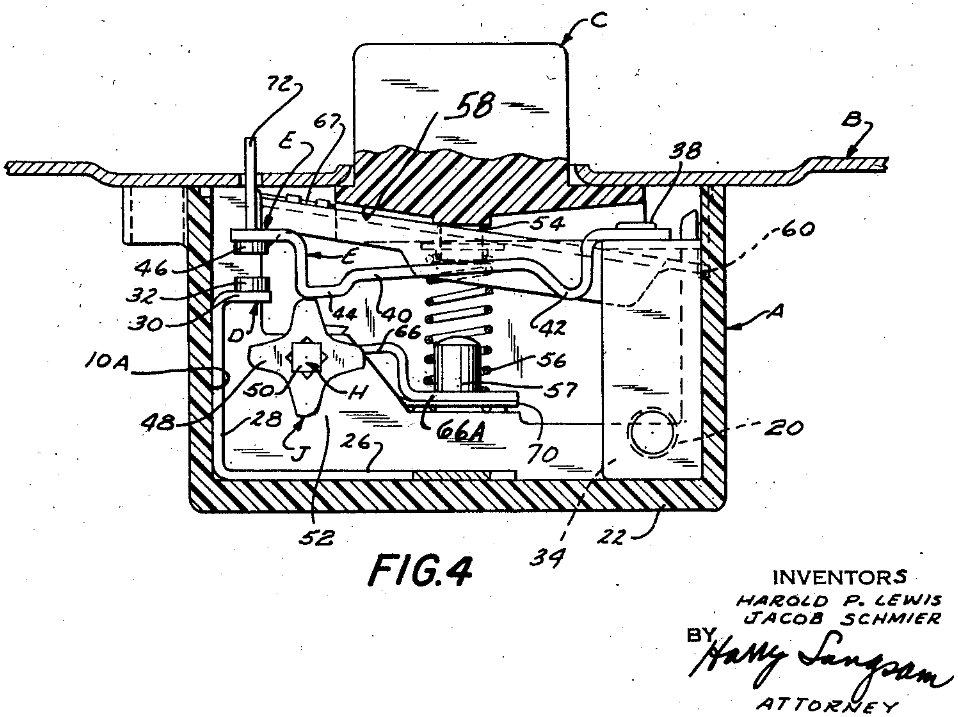
Fig. 4 is a fragmentary sectional side view showing the cam for controlling the contacts into closed or open circuit position.
Figure 5:
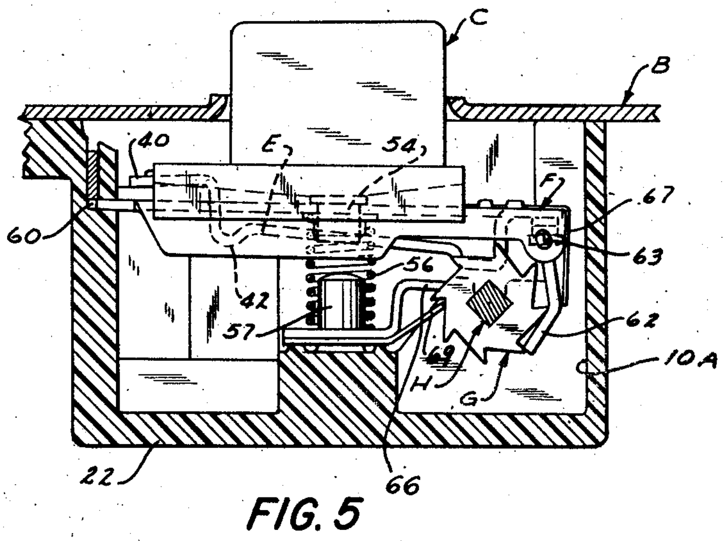
Fig. 5 is a view similar to Fig. 3 wherein the button has been pushed downwardly.

In operation, linear inward pressure on the button C moves against the spring 56, thereby moving the free end of the pawl lever F, whereby the pawl 62 moves the ratchet wheel G an arcuate distance equal to the distance between two ratchet teeth. The arcuate distance between two adjacent ratchet teeth is equal to one-half the arcuate distance between two adjacent lobes on the cam J. As Fig. 4 is viewed the contacts D and E are in open circuit position; when the button C is pushed it causes the rotation of one ratchet tooth, as well as the lobe 48 on the cam J to close the contacts D and E as is shown in Fig. 6.

Figure 6:
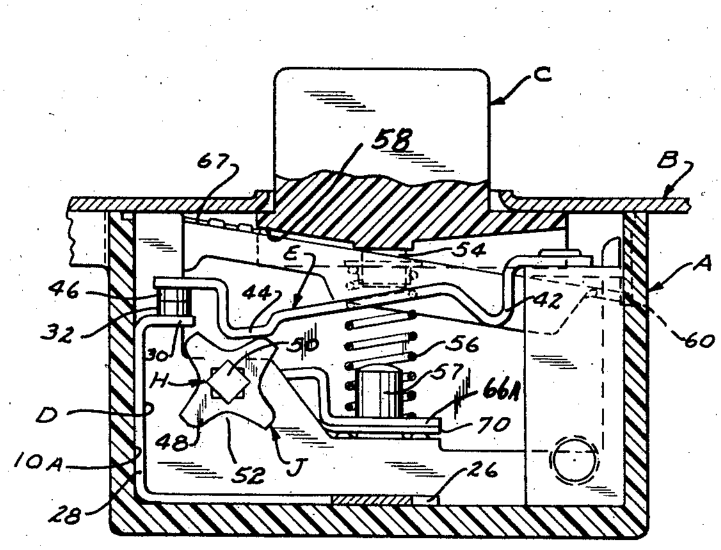
Fig. 6 is a view similar to Fig. 4 wherein the contacts have been engaged.

In Fig. 6, the space 52 of the cam J comes under the curve 44 of the spring arm so that the spring arm E drops, thereby closing the circuit. A successive push upon the button C (Fig. 6) causes the ratchet wheel to move one ratchet tooth distance to move the cam so that one lobe 48 again will be beneath the U-shaped curve 44 (Fig. 4) on the movable spring arm E to cause the spring arm E to separate from the fixed arm D, thereby opening the circuit.

The invention may be varied to embody a double set of contacts by utilizing the same parts as hereinbefore described with an additional set of contacts D and E, and an additional cam J.

When two cams J, J are located on one shaft on opposite sides of the ratchet wheel, they may be timed to actuate the contacts at intervals of 45° movement of the shaft whereby one set of the contacts is open while the other set of contacts is closed.

Figures 7, 8:
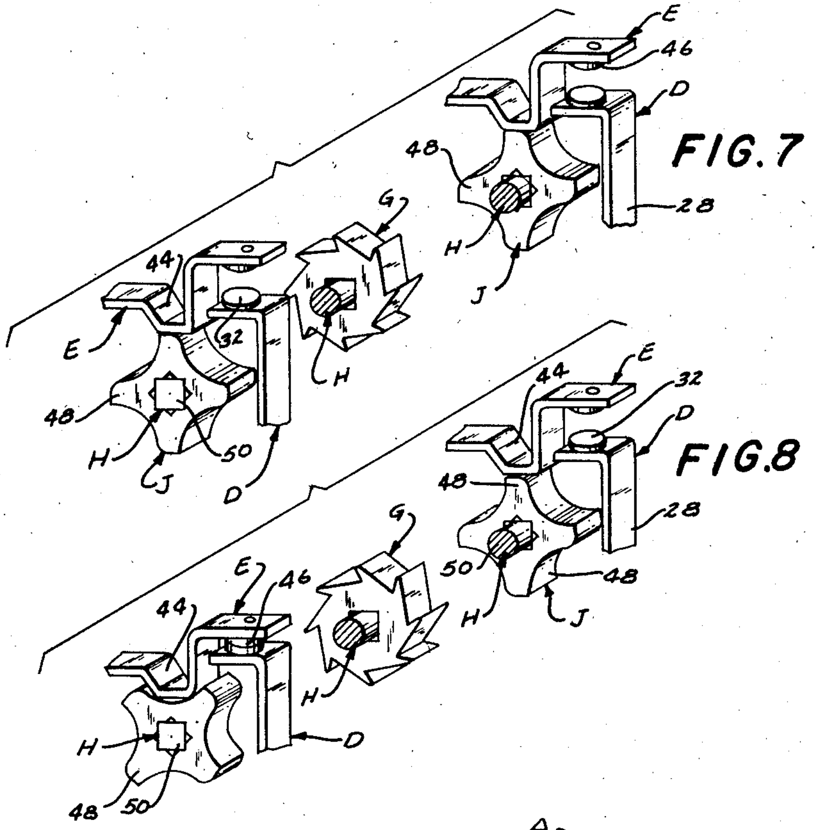
Fig. 7 is a fragmentary perspective view showing the relationship of a double set of contacts wherein both contacts are opened or closed simultaneously when the ratchet wheel is actuated.
Fig. 8 is a fragmentary perspective view of a three-way switch wherein one set of contacts is engaged and the other set of contacts is separated when the ratchet wheel is actuated.

It is to be noted, as in Figs. 7 and 8, that the cam J has a central opening wherein there are eight right angle internal surfaces which are continuously joined together to form eight points defining a bearing. Noting that the shaft H is square at the point 50 and that the cam J is mounted upon the shaft, the position of the cam J can be changed with respect to the timing of a second similarly constructed cam J, which also is mounted upon the shaft H for different timing position.

For example, in Fig. 7, a double pole single throw switch is illustrated wherein both sets of contact arms D and E are open, whereas in Fig. 8, the invention is applied to a three-way switch wherein one set of contacts is closed while the other set of contacts is open.

In this way, the switch may be utilized as a double pole, single throw switch, or a three-way switch.

In Figs. 7 and 8, the central opening of the cam J has the eight right angle interval surfaces numbered 1 to 8. and in Fig. 7 both cams J are located on square shaft H at the points 2, 4, 6, and 8 so that both sets of contacts are made and broken at the same time.

In Fig. 8, the left-hand cam J is located in the square shaft at points 1, 3, 5 and 7, whereas the right-hand cam J is located on the square shaft H at the points 2, 4, 6, and 8, thereby the cams J, J are timed to have their lobes engage the movable spring contact E at a spaced interval of 45° so one set of contacts is opened while the other set of contacts is closed and vice versa.

Figure 15:
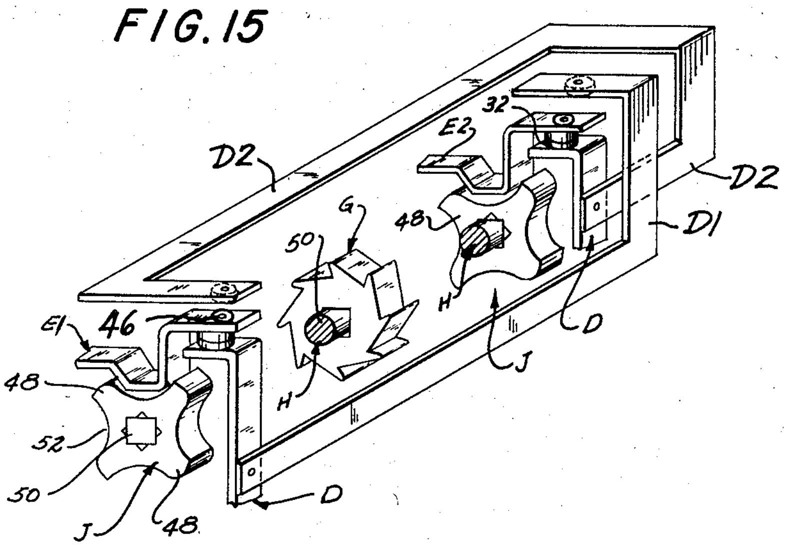
Fig. 15 is a fragmentary perspective view showing the relationship of the contacts for a four-way electrical switch.

In Fig. 15 is shown the electrical connections for a four-way switch embodying the principles hereinbefore described, wherein a fixed contact D on one side is connected by conductor D1 whereby it overlies the movable contact E2 of the second pair of contacts likewise, the second contact D is joined by a conductor D2 to overlie the first movable contact E1. In Fig. 15 contacts D, E1; and D, E2 are closed while contacts D2, E1 and D1, E2 are open. It is to be noted that the movable contacts E1 and E2 have contact buttons 46 both on the top and the bottom side.

Our invention is also applicable to controlling the starting and stopping of any machinery which requires attention from the part of the operator, and wherein the circuit is actuated by a direct touch of the control.

Referring to Fig. 4, the projection 72 mounted adjacent the contact end 6 of the arm E projects outwardly of the support B and through the switch plate, which when projected outwardly indicates that the contact is open, and when the contacts are made, the projection is not visible to indicate that the contacts are closed, or we may use a neon light over the contacts which indicates that they are open or closed, and which is mounted inside of the button C. In other words, the button C can have a neon lamp mounted within. Said neon lamp may be connected into the circuit in such a way as to glow visibly when the switch is in the "on" position.

Figure 9:
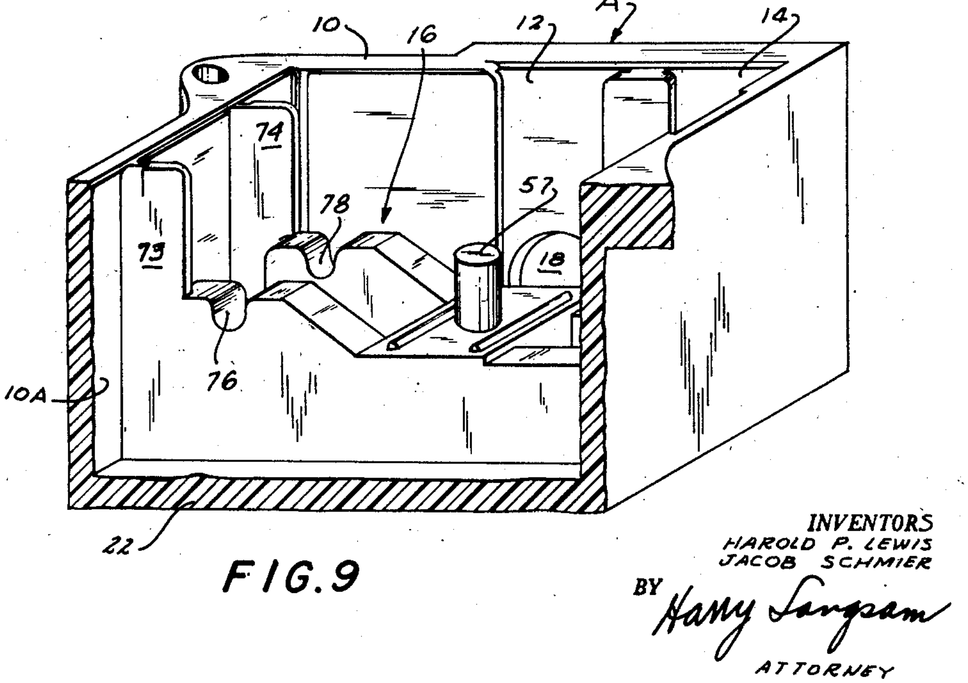
Fig. 9 is a perspective view of the casing itself.
Figure 10:
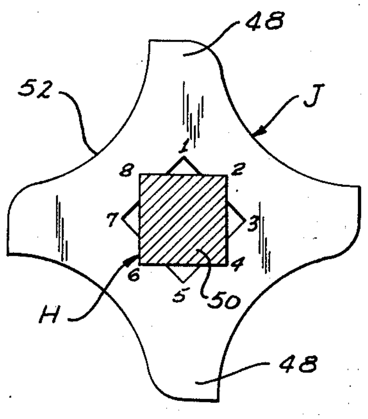
Fig. 10 is a side view of the cam located upon the square portion of the combined cam and ratchet wheel shaft whereby the cam is located in one position with respect to the shaft.
Figure 11:
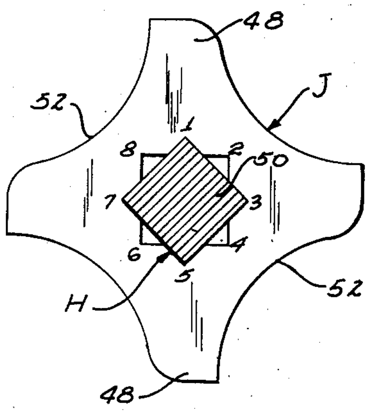
Fig. 11 shows the same view wherein the timing of the cam upon the shaft has been shifted 45°.

Referring to Fig. 9, a pair of spaced barriers 73, 74 project from the wall 10A of the casing and serve as guides for the pawl arms and for the spring contacts E. The bottom 22 of the casing has a pair of integrally molded spaced bearings 76, 78 upon which the rounded portion of the shaft H rotates.

Although our invention has been described in considerable detail, such description is intended as being illustrative rather than limiting, since the inventon may be varously embodied, and the scope of the invention is to be determined as claimed.

We claim as our invention:

1. An electrical switch comprising a parallelepiped casing, a plurality of T-shaped slots in the side wall, a pair of bearings integrally formed with said casing, said casing of insulating material, a shaft comprising a portion thereof which is square and a portion thereof which is circular and being mounted upon said bearings in said casing, a cam having a multiplicity of lobes mounted upon said square portion of said shaft, a ratchet wheel securely fastened to said shaft and rotatable in unison with said shaft, a plurality of contacts mounted in said T-shaped portion of the walls of said housing, one of said contacts being flexible and being adapted to be moved and one of said lobes being adapted to move said flexible contact, a projection integrally mounted upon the center of said bottom wall, a helical spring mounted upon said projection, a button adapted to press upon said spring, a pivoted pawl lever located between said spring and said button, and a pawl pivotally connected to one end of said pawl lever, and a spring connected to said pawl lever and said pawl which is adapted to press said pawl against said ratchet wheel.

2. The invention of claim 1 including a detent in said casing for said ratchet wheel, and a spring member engaging said shaft to keep said shaft in engagement with said bearing.

3. The invention of claim 2 wherein said spring member includes a base having a central opening therein and a pair of spring fingers attached to said base wherein said fingers overlie and engage said shaft and retaining said shaft in said bearings, said projection interfitting with said central opening in said base.

4. An electrical switch comprising a parallelepiped casing having a plurality of walls and being of insulating material, a plurality of T-shaped slots in one of said walls, a pair of bearings integrally formed within the bottom of said casing, a shaft comprising a portion thereof which is circular and a portion thereof which is square and said circular portion being mounted upon said bearings in said casing, a cam having a multiplicity of lobes mounted upon said square portion adjacent each end of said shaft, a ratchet wheel securely fastened to the center of said shaft and rotatable in unison with said shaft, a plurality of contact members each mounted in one of said T-shaped slots of said casing, one of said contacts being flexible and movable and being adapted to engage another of said contact members, and one of said lobes being adapted to engage and to move said flexible contact, a projection integrally mounted upon the center of said bottom wall, a helical spring mounted upon said projection, a push button adapted to be pressed outwardly of said casing by said spring, a pivoted pawl lever located between said projection and said button, a pawl pivotally connected to one end of said pawl lever, and a spring connected to said pawl lever and said pawl which spring is adapted to press said pawl against said ratchet wheel.

5. An electrical switch actuated by a rectilinear pressure for successive "off" and "on" operation comprising a casing of insulated material having a chamber therein, a control button movable into said chamber, a pair of aligned bearings integrally formed as part of said casing, a shaft having thereon a ratchet wheel and a cam whereby said shaft, ratchet wheel and cam rotate in unison, said cam having a plurality of radially extending lobes, said shaft being mounted upon and rotatable upon said bearings, a pawl actuator, a pawl pivotally mounted upon said pawl actuator and being movable by movement of said pawl actuator and said button inwardly and said pawl being adapted to move said ratchet wheel whereby said cam is moved, spring means to normally bias said pawl actuator and said button outwardly of said chamber, a spring in engagement with said pawl actuator and with said pawl whereby said pawl will be maintained in engagement with said ratchet wheel, and a pair of complementary electrical contacts one of which is fixed and the other of which is flexible, said lobes on said cam being adapted to engage said flexible electrical contact to control the electrical circuit.

6. An electrical switch comprising a parallelepiped casing having a plurality of walls of insulating material, a plurality of T-shaped slots in one of said walls, a pair of bearings integrally formed with said casing, a shaft having a cam and a ratchet wheel whereby said shaft, cam and ratchet wheel rotate in unison, said cam having a multiplicity of lobes thereon, a plurality of complementary electrical contact members each mounted in one of said T-shaped slots of said casing, one of said electrical contacts being flexible and being adapted to engage its complementary contact, one of said lobes being adapted to engage and to move said flexible contact, a control button actuated by a rectilinear pressure outside said casing, a pawl actuator, a pawl for said ratchet wheel pivotally mounted upon said pawl actuator, spring means pressing said pawl actuator against said button whereby said button and pawl actuator will be normally pressed outwardly of said chamber, a spring connected to said pawl actuator and said pawl which spring is adapted to press said pawl against said ratchet wheel and a detent to arrest the movement of said ratchet wheel in one direction of movement.

References Cited in the file of this patent

UNITED STATES PATENTS

| | | |
|---|---|---|
| 683,692 | Landin | Oct. 1, 1901 |
| 1,495,592 | Holland | May 27, 1924 |
| 2,395,572 | Meuer et al. | Feb. 26, 1946 |
| 2,517,845 | Cooper | Aug. 8, 1950 |
| 2,547,998 | Brockway | Apr. 10, 1951 |
| 2,721,914 | Cheltz | Oct. 25, 1955 |
| 2,727,956 | Winter | Dec. 20, 1955 |
| 2,743,330 | Ludwig | Apr. 24, 1956 |

FOREIGN PATENTS

| | | |
|---|---|---|
| 341,859 | Italy | May 11, 1936 |
| 215,215 | Switzerland | June 15, 1941 |
| 962,714 | France | Dec. 12, 1949 |